United States Patent [19]

Zulliger

[11] 4,420,984
[45] Dec. 20, 1983

[54] STRING-TYPE MEASUREMENT CELL

[75] Inventor: Hans R. Zulliger, Feldmeilen, Switzerland

[73] Assignee: Mettler Instrumente A.G., Greifensee, Switzerland

[21] Appl. No.: 310,978

[22] Filed: Dec. 9, 1981

[30] Foreign Application Priority Data

Dec. 16, 1980 [CH] Switzerland ............... 9254/80

[51] Int. Cl.³ .............................................. G01L 1/10
[52] U.S. Cl. .................. 73/862.59; 73/704; 73/778; 73/DIG. 1
[58] Field of Search ............... 73/DIG. 1, 581, 704, 73/778, 517 AV, 812.59; 177/210 FP; 331/156

[56] References Cited

U.S. PATENT DOCUMENTS 3,411,347 11/1968 Wirth et al. .................. 73/862.59
3,701,392 10/1972 Wirth et al. .................. 73/DIG. 1
4,058,007 11/1977 Exner ........................... 73/DIG. 1

FOREIGN PATENT DOCUMENTS 422985 9/1974 U.S.S.R. ...................... 73/DIG. 1

Primary Examiner—Charles A. Ruehl
Attorney, Agent, or Firm—Laubscher, Philpitt & Laubscher

[57] ABSTRACT

A cast string-type measurement cell, including a metallic string member having cast thereto nodal masses, clamping elements, and spring and suspension elements, thereby to define an integral structural assembly that may be formed by a casting mold in substantially finished condition ready for installation in the measuring apparatus. Preferably, the string is formed of an amorphous metal, and the cast components comprise a glass-fiber-reinforced synthetic plastic material.

10 Claims, 2 Drawing Figures

STRING-TYPE MEASUREMENT CELL

REFERENCE TO RELATED APPLICATION

This application is a companion application to U.S. application Ser. No. 300,487 filed Sept. 9, 1981 in the name of Eugene Meier entitled "Flat Measuring String Construction", now U.S. Pat. No. 4,378,702.

BRIEF DESCRIPTION OF THE PRIOR ART

This invention relates to a measurement cell for a string measurement instrument for force, pressure, or distance measurement, comprising a measurement string with pertinent clamping elements, as well as exciter elements for effecting transversal string oscillations. An example of a vibrating string measuring instrument is shown in the Wirth et al U.S. Pat. No. 3,411,347.

In such measurement cells, a number of rather contradictory requirements and conditions must be considered. In dealing with precision measurement instruments with correspondingly high requirements in terms of the accuracy and reproducibility of measurements, these requirements regularly can be met only in part, in the form of compromises as a result of optimization considerations. The string itself—together with the structural components immediately associated with it, such as, for example, nodal masses and clamping and/or coupling members—are of central significance here. The material and the design of the individual elements, as well as the way in which they are combined, decisively influence essential properties of the measurement cell, such as the accuracy and stability of oscillations, signal modulation percentage, sensitivity toward temperature and other disturbing influencing factors. The best possible utilization of the existing possibilities here are countered not only by the physical conditions but often by production problems and/or cost considerations.

In the Swiss Pat. No. 533,299, a measurement string is disclosed which, made of one piece, also comprises adjoining clamping elements which at the same time function as nodal masses, plus suspension members (design-coupling elements for force transmission), and bending connections. This known structural assembly facilitates very good disconnection between the string and, on the one hand, the housing and, on the other hand, the load receiver and it thus facilitates excellent oscillation quality. The reproducibility during manufacturing is also good. These advantages are obtained by means of relatively complicated and expensive production procedures; moreover, it is frequently disadvantageous that the entire assembly consists of the same material already on account of the disproportionately high material requirement which is certainly significant in case of expensive string material. For the strings as such, particularly suitable materials are often very problematical in terms of their possibilities for processing or working.

In another known string measurement instrument (German Patent Application laid open to inspection No. 2,518,294) not only the clamping elements but also the nodal masses are clamped against the string. As an alternative construction, the latter are also soldered or welded together with the string. All of these known methods possess considerable disadvantages in terms of the manufacturing expenditure and/or their effects on the quality of the measurement cell, for example, regarding the quality of oscillations and/or the long-term stability and/or the stressability (clamping points are weak points, and soldering points have an attenuating effect on the oscillations).

SUMMARY OF THE INVENTION

It is the primary object of the present invention to provide a measurement cell of type discussed above which combines efficient producibility with high quality, which furthermore facilitates extensive freedom in the choice of string material—i.e., permits the use of expensive, high-grade material—without any major additional cost and without any need for having to use the known, disadvantageous methods in assembling the string inself and the nodal masses.

In accordance with a more specific object of the invention, the nodal masses are formed by casting on the metallic string element, thereby affording a significant improvement to the art. This improvement becomes more apparent when the string is also provided with cast clamping elements.

In a further development of the invention, excitation elements are connected by casting onto one of the clamping elements.

Finally, in accordance with the invention, the suspension elements are also formed by casting, thereby affording an integral structural assembly which essentially can be made in one operation.

In most cases, it is desirable or necessary to take specific measures to disconnect or to prestress the string. For these cases, a further development of the invention provides that a spring element be arranged between the clamping element and the suspension element. The spring element here is advantageously likewise cast on, although other solutions are fundamentally practicable, such as, for example, the subsequent insertion of a metal spring.

According to a more specific object, the string comprises a metal alloy—preferably, an amorphous material. This material group, in terms of the requirements mentioned initially for the string, contains very favorable properties and the novel combination of string, on the one hand, and the cast-on accessories, on the other hand, which is facilitated according to the invention, permits economical utilization of this relatively expensive material.

Basically, various material pairings are possible between string and accessory, for example, the combination of differing metal alloys. Preferably, the cast-on elements consist of glass-fiber-reinforced synthetic substance.

One preferred version with defined oscillation direction results when the string has a rectangular cross-section.

BRIEF DESCRIPTION OF THE DRAWING

Other objects and advantages will become apparent from a study of the following specification when viewed in the light of the accompanying drawing, in which.

DETAILED DESCRIPTION

Figure 1:
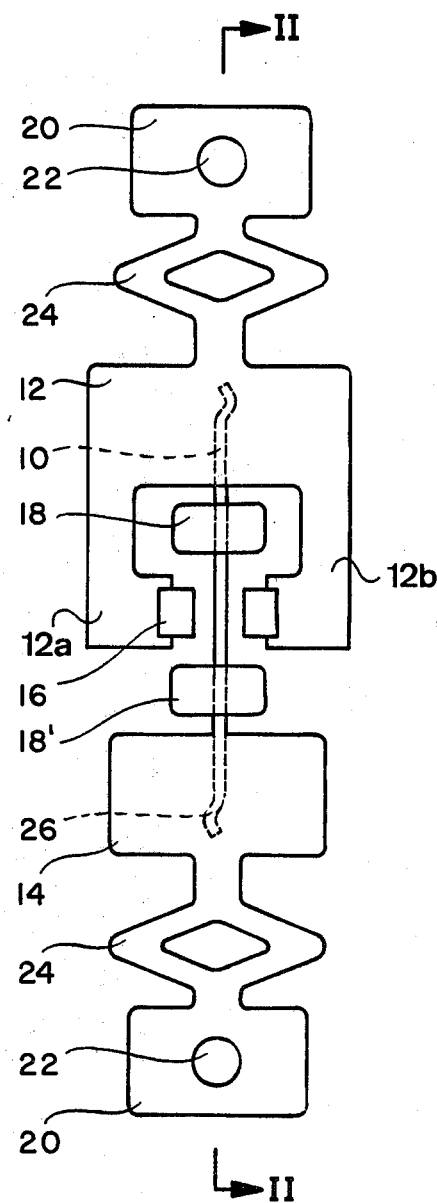
FIG. 1 is a side elevational view of the measuring cell of the present invention.

Referring now to the drawings, a flat metallic measuring string 10 having a rectangular cross-section is provided to the ends of which are connected a pair of clamping elements 12 and 14 respectively. The upper clamping element 12 is of C-shaped configuration and includes a pair of downwardly depending leg portions 12a, 12b to which are connected a pair of permanent magnet excitation or driving elements 16, respectively, which excitation elements are adjacent the center of the measuring string 10. Cast upon the string 10 at the nodal point thereof are a pair of nodal masses 18, 18', the upper nodal mass 18 being freely contained within the space between the leg portions 12a, 12b of the upper clamping element 12. Connected with the ends of the clamping elements remote from the measuring string are a pair of suspension or coupling elements 20 each provided with an aperture 22 for receiving a mounting pin, screw or the like. The suspension elements serve to transmit the forces to be measured to the string, one suspension element being connected with the frame or other fixed portion of the apparatus, while the other suspension element is connect with the load receiver. Spring elements 24 connect the suspension elements 20 with the clamping elements 12 and 14, respectively, each spring being hollow and serving to uncouple the string in terms of ocillations.

The attachment of the string to the clamping members and to the nodal masses can be achieved through suitable design of the string. This can be accomplished by cutouts, apertures, by bending portions of the string (as shown by the terminal bent portion 26), or by roughening the surface of the string (by sand blasting, for example).

Figure 2:
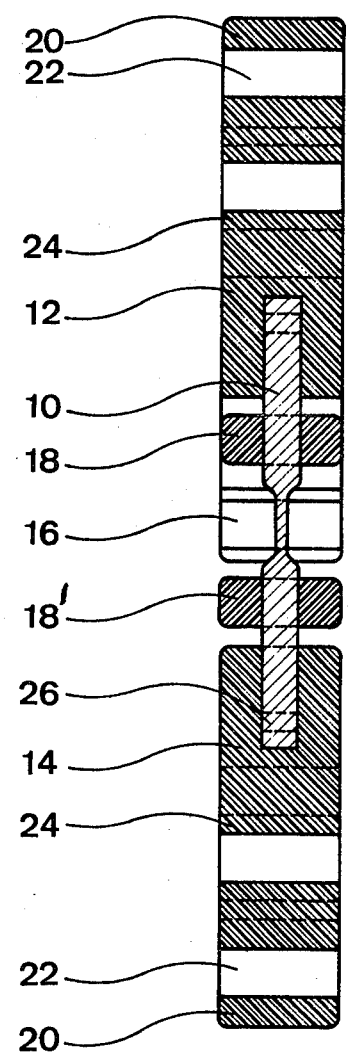
FIG. 2 is a sectional view taken along line II—II of FIG. 1.

As shown in FIG. 2, the structural measuring cell assembly has the same thickness over its entire length. Preferably the cell is of integrally cast construction, the ends of the string being embedded within the clamping elements 12 and 14, respectively, that are integral with the spring and suspension elements. The cast clamping, nodal, spring and suspension elements 12, 14, 18, 24 and 20 are preferably formed of the same synthetic plastic material. Such a structural assembly may be very accurately and precisely formed by means of known casting techniques, in mass quantity production.

Casting materials are selected having the following properties:
melting point considerably lower than that of the string material;
easy castability;
shrinkage during cooling (for better adhesion to string);
mass stability after hardening and cooling as well as under load;
hydrophobia;
high tear resistance;
high elasticity module;
high electrical resistance; and
low expansion coefficient with temperature.

Glass-fiber-reinforced polyphenylenesulfide, as sold under the name "Ryton 4", for example, is a preferred material meeting most of the requirements mentioned above.

The following criteria are essentially decisive for string material:
high tear strength;
good corrosion resistance;
low hysteresis after expansion; and
small expansion coefficient with temperature.

Furthermore, the string should preferably have high alternating stress resistance and low dependence of the elasticity module relative to temperature, and it should also be non-magnetic. A group of materials meeting these conditions extensively consists of suitable alloys from the family of amorphous metals (also called metallic glasses). Here we for instance consider iron-boron alloys with the composition $Fe_{80}B_{20}$, as well as those which are alloyed with a little bit of chrome or some other transition element. The latter facilitate the adjustment of a particularly low temperature coefficient in the elasticity module.

Numerous variations are possible within the scope of the present invention. For example, instead of the permanent magnets 16, magnetic coils could be recessed into the clamping element 12. The dimensions can also be chosen within a broad range; for example, strings with a width of just a few millimeters and a thickness of only a few 1/100 of a millimeter. were used. The precise and reproducible positioning of the nodes but also of the exciter elements, as facilitated by the invention, are of special advantage precisely with a view to such small dimensions. As for the rest it might be mentioned once again that, in executing the invention as shown in the example, in other words, when making it as a quasi-integrated measurement cell with string, nodal, and clamping and suspension elements, the advantages of the invention emerge particularly clearly but that even partial combinations already offer noticeable progress (for example, when the string is used only with the cast-on nodal mass).

What is claimed is:
1. A measuring cell adapted for use in a string-type instrument for measuring force, pressure, distance or the like, comprising
   (a) a metallic measuring string (10); and
   (b) a plurality of cast nodal masses (18) each of which is cast in secured relation to said string at nodal points spaced from the ends of said string, respectively.
2. Apparatus as defined in claim 1, and further including a pair of cast clamping elements (12, 14) each cast in secured relation to the ends of said string, respectively.
3. Apparatus as defined in claim 2, and further including a pair of cast suspension elements (20) each cast in secured relation to said clamping elements at the ends thereof remote from said string, respectively.
4. Apparatus as defined in claim 3, and further including a pair of spring elements (24) connected by casting between said suspension elements and said clamping elements, respectively.
5. Apparatus as defined in claim 4, wherein said spring elements are formed by casting.
6. Apparatus as defined in claim 4, wherein each of said nodal masses, said clamping elements, said suspension elements and said spring elements comprises a glass-fiber-reinforced synthetic plastic material.
7. Apparatus as defined in claim 1, and further including a plurality of ferromagnetic excitation elements (16) connected by casting with one of said clamping elements for exciting said measuring string.
8. Apparatus as defined in claim 1, wherein said string is formed of a metal alloy.
9. Apparatus as defined in claim 8, wherein said metal alloy consists of an amorphous material.
10. Apparatus as defined in claim 9, wherein said metallic measuring string has a rectangular cross-section.

* * * * *